US012611949B2

(12) United States Patent
Bae et al.

(10) Patent No.: US 12,611,949 B2
(45) Date of Patent: Apr. 28, 2026

(54) CHARGING SYSTEM AND METHOD FOR ELECTRIC VEHICLE

(71) Applicant: DAEYOUNG CHAEVI CO., LTD., Daegu (KR)

(72) Inventors: Kyung Soo Bae, Suwon-si (KR); Sang Ho Kim, Yongin-si (KR)

(73) Assignee: DAEYOUNG CHAEVI CO., LTD., Daegu (KR)

( * ) Notice: Subject to any disclaimer, the term of this patent is extended or adjusted under 35 U.S.C. 154(b) by 841 days.

(21) Appl. No.: 17/814,958

(22) Filed: Jul. 26, 2022

(65) Prior Publication Data

US 2023/0026182 A1 Jan. 26, 2023

(30) Foreign Application Priority Data

Jul. 26, 2021 (KR) ........................ 10-2021-0098153
Jul. 14, 2022 (KR) ........................ 10-2022-0087224

(51) Int. Cl.
  *H02J 7/00* (2026.01)
  *B60L 53/16* (2019.01)
  (Continued)

(52) U.S. Cl.
  CPC ............. *B60L 53/305* (2019.02); *B60L 53/16* (2019.02); *B60L 53/67* (2019.02); *B60L 53/68* (2019.02);
  (Continued)

(58) Field of Classification Search
  CPC ........ B60L 53/305; B60L 53/67; B60L 53/68; B60L 53/16; B60L 53/31; B60L 2240/72; B60L 2270/32
  (Continued)

(56) References Cited

U.S. PATENT DOCUMENTS 7,986,126 B1 * 7/2011 Bucci ...................... B60L 53/14
                                                          320/109
9,180,783 B1 * 11/2015 Penilla .................... B60L 53/68
                  (Continued)

FOREIGN PATENT DOCUMENTS

CN         112116757 A      12/2020
EP          3656603 A1       5/2020
              (Continued)

OTHER PUBLICATIONS

Extended European Search Report for EP 22186673.4 by European Patent Office dated Dec. 12, 2022.
(Continued)

*Primary Examiner* — Alexis B Pacheco
(74) *Attorney, Agent, or Firm* — BROADVIEW IP LAW, PC

(57) ABSTRACT

An electric vehicle charging method includes at a user terminal, transmitting a location information of the user terminal to a management sever; at the management sever, determining at least one usable charging device corresponding to the location information; at the management sever, transmitting information for at least one determined charging device to the user terminal; at the user terminal, choosing at least one charging device among the at least one determined charging device; at the user terminal, transmitting a preemption request information for preemption at least one chosen charging device to the management server; at the management sever, locking at least one charging device corresponding to the preemption request information by transmitting a preemption order signal; at the management sever, transmitting information for a user of the user terminal to locked charging device; and unlocking the charging device corresponding to inputting a authentication information for authentication of the user.

20 Claims, 15 Drawing Sheets

(51) Int. Cl.

| | |
|---|---|
| *B60L 53/30* | (2019.01) |
| *B60L 53/67* | (2019.01) |
| *B60L 53/68* | (2019.01) |
| *G06Q 50/06* | (2012.01) |
| *H02J 7/14* | (2006.01) |
| *H02J 7/47* | (2026.01) |
| *B60L 53/31* | (2019.01) |

(52) U.S. Cl.
CPC ............... *G06Q 50/06* (2013.01); *H02J 7/47* (2026.01); *B60L 53/31* (2019.02); *B60L 2240/72* (2013.01); *B60L 2270/32* (2013.01)

(58) Field of Classification Search
USPC ........................................................ 320/109
See application file for complete search history.

(56) References Cited

U.S. PATENT DOCUMENTS

| | | | | |
|---|---|---|---|---|
| 10,981,464 | B1* | 4/2021 | Sun ......................... | B60L 53/51 |
| 12,322,986 | B2* | 6/2025 | Baldasare .......... | G07C 9/00896 |
| 2010/0013433 | A1* | 1/2010 | Baxter ................. | G07F 15/003 |
| | | | | 320/109 |
| 2010/0274656 | A1* | 10/2010 | Genschel ................ | B60L 53/80 |
| | | | | 705/14.27 |
| 2011/0279082 | A1* | 11/2011 | Hagenmaier, Jr. ...... | B60L 53/18 |
| | | | | 320/109 |
| 2011/0279083 | A1* | 11/2011 | Asai ........................ | B60L 50/20 |
| | | | | 320/109 |
| 2012/0233077 | A1* | 9/2012 | Tate, Jr. ................. | G06Q 10/20 |
| | | | | 705/65 |
| 2013/0021162 | A1* | 1/2013 | DeBoer ................... | B60L 53/68 |
| | | | | 320/109 |
| 2013/0181674 | A1* | 7/2013 | Tremblay ................ | B60L 53/16 |
| | | | | 320/109 |

| | | | | |
|---|---|---|---|---|
| 2014/0125279 | A1* | 5/2014 | Juhasz ...................... | H02J 7/00 |
| | | | | 320/109 |
| 2014/0170880 | A1* | 6/2014 | Doi ........................ | B60L 53/305 |
| | | | | 439/305 |
| 2014/0371969 | A1* | 12/2014 | Asai ........................ | B60L 58/40 |
| | | | | 701/22 |
| 2015/0298565 | A1* | 10/2015 | Iwamura ................ | G06Q 10/04 |
| | | | | 701/22 |
| 2017/0267114 | A1* | 9/2017 | Bianco .................... | B60L 53/18 |
| 2018/0105051 | A1 | 4/2018 | Zheng et al. | |
| 2019/0130318 | A1 | 5/2019 | Lee et al. | |
| 2019/0210468 | A1* | 7/2019 | Wittl ................... | H02J 7/00714 |
| 2019/0351783 | A1* | 11/2019 | Goei ...................... | G08G 1/202 |
| 2020/0353836 | A1* | 11/2020 | Imberger ............... | B60L 53/66 |
| 2021/0347275 | A1* | 11/2021 | Chakraborty .... | G06Q 10/06315 |
| 2022/0085626 | A1* | 3/2022 | Singh ...................... | B60L 53/62 |
| 2024/0131954 | A1* | 4/2024 | Harada ................... | B60L 53/68 |

FOREIGN PATENT DOCUMENTS

| | | | |
|---|---|---|---|
| JP | 2013-211601 | A | 10/2013 |
| JP | 2014-149611 | A | 8/2014 |
| JP | 2014-230421 | A | 12/2014 |
| KR | 10-2014-0079593 | A | 6/2014 |
| KR | 10-2015-0075745 | A | 7/2015 |
| KR | 10-2018-0010169 | A | 1/2018 |
| KR | 10-2018-0010375 | A | 1/2018 |
| KR | 10-2018-0061569 | A | 6/2018 |

OTHER PUBLICATIONS

Office Action for JP 2022-118924 by Japan Patent Office dated Jun. 6, 2023.
Office Action for KR 10-2022-0087224 by Korean Intellectual Property Office dated Jun. 20, 2024.

\* cited by examiner (A)

(B)

PH        TCD        P1

10

Currently, this charging device is preempted at the request of "6340" customer.

Please, Enter a passward

PIW (A)

Locking
311
310
320
315
313
314
312

| CHOICE OF ONE PIECE | | |
|---|---|---|
| WAITING TIME | WEIGHT | FEE |
| 10MINUTES | 1 | 500 WON |
| 15MINUTES | 1 | 1000 WON |
| 20MINUTES | 1 | 2000 WON |
| 25MINUTES | 1 | 4000 WON |
| 30MINUTES | 1 | 8000 WON |

(A)

| CHOICE OF TWO PIECES | | |
|---|---|---|
| WAITING TIME | WEIGHT | FEE |
| 10MINUTES | 1.2 | 600 WON |
| 15MINUTES | 1.2 | 1200 WON |
| 20MINUTES | 1.2 | 2400 WON |
| 25MINUTES | 1.2 | 4800 WON |
| 30MINUTES | 1.2 | 9600 WON |

(B)

CHARGING SYSTEM AND METHOD FOR ELECTRIC VEHICLE

CROSS-REFERENCE TO RELATED APPLICATIONS

This application claims priority under 35 U.S.C § 119 to Korean Patent Application No. 10-2021-0098153, filed on Jul. 26, 2021, and Korean Patent Application No. 10-2022-0087224, filed on Jul. 14, 2022, in the Korean Intellectual Property Office, the disclosure of which are incorporated herein by reference in its entirety.

FIELD OF THE INVENTION

Embodiments of the invention relate to charging system and method for electric vehicle.

DISCUSSION OF RELATED ART

The spread of electric vehicles is increasing all over the world.

While the supply of electric vehicles is increasing, there is a problem that it is difficult to charge electric vehicles due to the lack of electric vehicle charging stations.

In addition, there is a problem that the standby time at an electric vehicle charging station may be longer due to the high demand for charging compared to the charging device.

SUMMARY OF THE INVENTION

The present invention is directed to a charging method for electric vehicle, the method including; at a user terminal, transmitting a location information of the user terminal to a management sever; at the management sever, determining at least one usable charging device corresponding to the location information; at the management sever, transmitting information for at least one determined charging device to the user terminal; at the user terminal, choosing at least one charging device among the at least one determined charging device; at the user terminal, transmitting a preemption request information for preemption at least one chosen charging device to the management server; at the management sever, locking at least one charging device corresponding to the preemption request information by transmitting a preemption order signal; at the management sever, transmitting information for a user of the user terminal to locked charging device; and unlocking the charging device corresponding to inputting a authentication information for authentication of the user.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIGS. 14 to 16 are diagrams for describing an example of a method of preempting a plurality of charging devices.

DETAILED DESCRIPTION OF EXEMPLARY EMBODIMENTS

In order to describe the present disclosure, operational advantages of the present disclosure, and purposes achieved by embodiments of the present disclosure, hereinafter, preferable embodiments of the present disclosure will be described and the present disclosure will be examined with reference to the preferable embodiments.

First, terms used in the present disclosure are used only to describe the particular embodiments and not to limit the present disclosure, and the singular form may be intended to also include the plural form, unless the context clearly indicates otherwise. Further, it should be further understood that the terms "include," "including," "provide," "providing," "have," and/or "having" specify the presence of stated features, integers, steps, operations, elements, components, and/or groups thereof but do not preclude the presence or addition of one or more other features, integers, steps, operations, elements, components, and/or groups thereof.

In a description of the present disclosure, when specific descriptions such as related known functions or configurations related to the present disclosure unnecessarily obscure the spirit of the present disclosure, a detailed description of the specific descriptions will be omitted.

In order to describe the present disclosure, operational advantages of the present disclosure, and purposes achieved by embodiments of the present disclosure, hereinafter, preferable embodiments of the present disclosure will be described and the present disclosure will be examined with reference to the preferable embodiments.

First, terms used in the present disclosure are used only to describe the particular embodiments and not to limit the present disclosure, and the singular form may be intended to also include the plural form, unless the context clearly indicates otherwise. Further, it should be further understood that the terms "include," "including," "provide," "providing," "have," and/or "having" specify the presence of stated features, integers, steps, operations, elements, components, and/or groups thereof but do not preclude the presence or addition of one or more other features, integers, steps, operations, elements, components, and/or groups thereof.

In a description of the present disclosure, when specific descriptions such as related known functions or configurations related to the present disclosure unnecessarily obscure the spirit of the present disclosure, a detailed description of the specific descriptions will be omitted.

Figure 1:
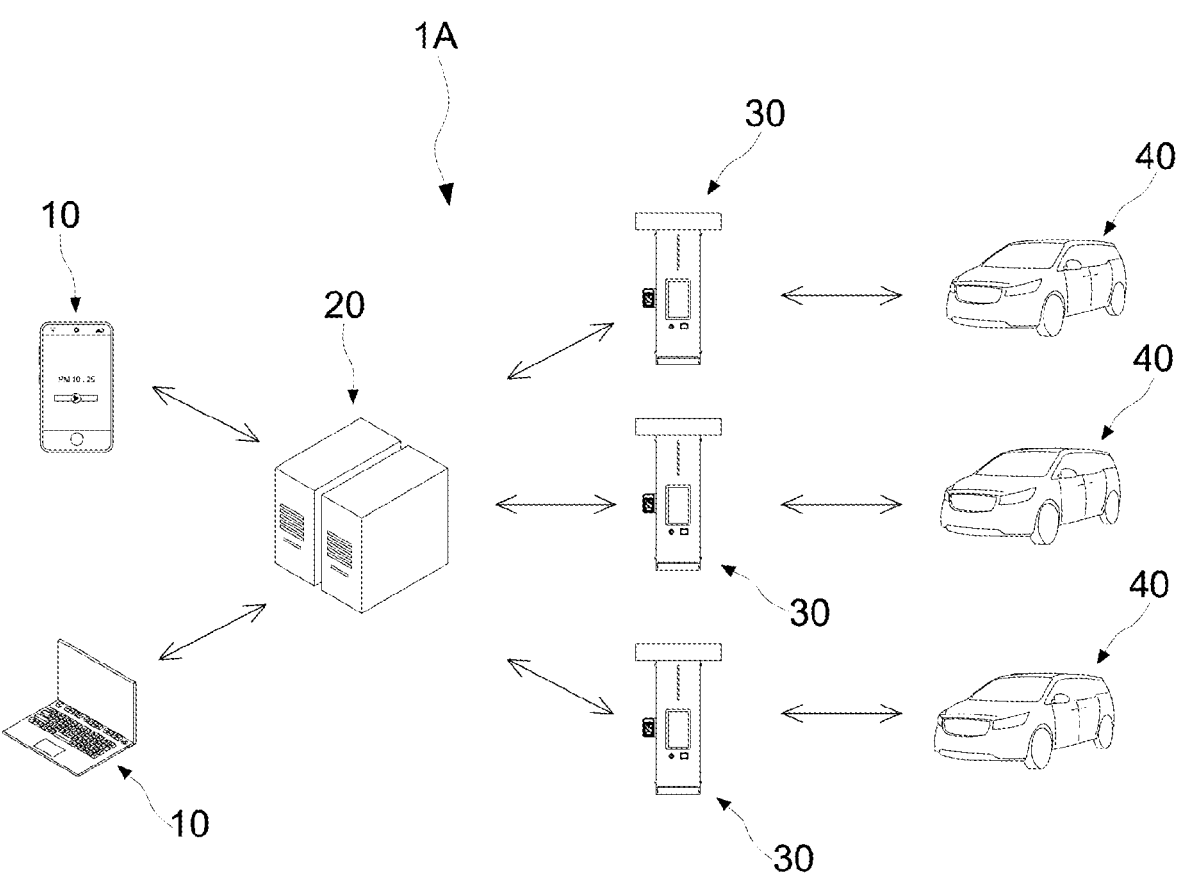
FIGS. 1 to 3 are diagrams for describing a charging system for an electric vehicle according to the present disclosure.
Figure 2:
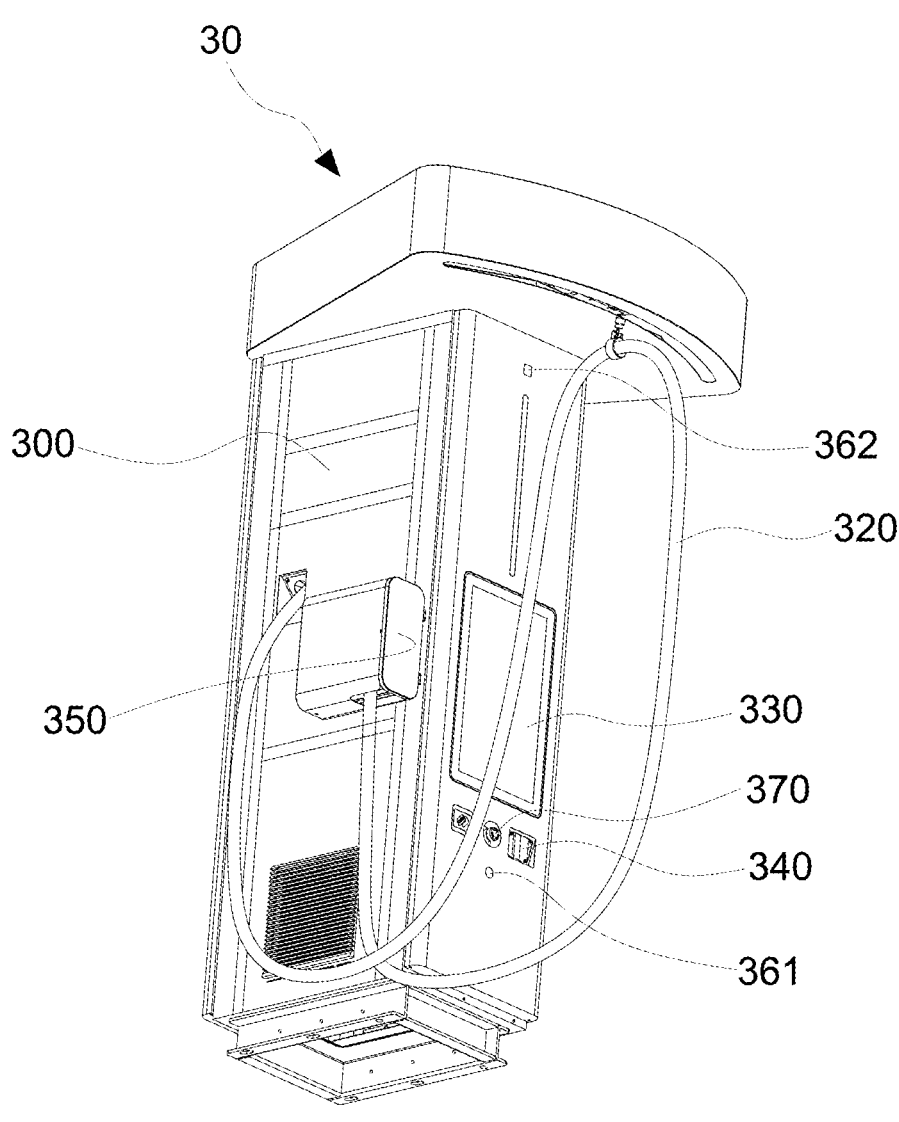
Figure 3:
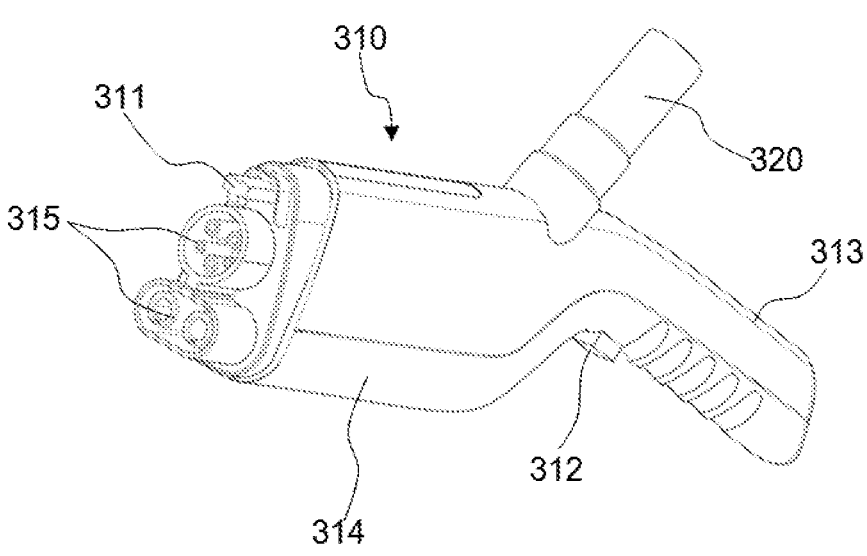

FIGS. 1 to 3 are diagrams for describing a charging system for an electric vehicle according to the present disclosure.

Referring to FIG. 1, a charging system 1A for an electric vehicle (also, referred to as a "charging system") according to the present disclosure may include a user terminal 10, a management server 20, and a charging device 30.

The user terminal 10 may be a terminal corresponding to a user who is a driver of an electric vehicle 40.

The user terminal 10 may transmit preemption request information for preempting at least one charging device 30 to the management server 20.

To this end, the user terminal 10 may communicate with the management server 20 in a wired or wireless manner.

The user terminal 10 may be a wireless communication terminal such as a smart phone, a tablet computer, a navigation device installed in a vehicle, or a wired communication terminal such as a desktop computer.

The user terminal 10 may transmit location information thereof to the management server 20.

To this end, the user terminal 10 may include a global positioning system (GPS) module.

The management server 20 may determine at least one usable charging device 30 corresponding to the location information received from the user terminal 10.

To this end, the management server 20 may determine and store location information of each charging device 30 in advance.

The management server 20 may lock at least one charging device 30 by transmitting a preemption command signal to at least one charging device 30 corresponding to the pre-emption request information of the user terminal 10.

To this end, the management server 20 may communicate with the user terminal 10 and the charging device 30.

For example, the management server 20 may be con-nected to a plurality of charging devices 30 through a WebSocket method according to open charge point protocol (OCPP) 2.0.

In a state of being locked, the charging device 30 may be unlocked in response to authentication information that is input for user authentication by the user terminal 10.

In a state of being unlocked, the charging device 30 may charge the electric vehicle 40 corresponding to the user terminal 10.

From another point of view, the charging device 30 may charge a battery (not shown) of the electric vehicle 40 corresponding to the user terminal 10.

In a process of charging the electric vehicle 40, the charging device 30 may acquire information about the electric vehicle 40 from the electric vehicle 40, for example, various types of information such as a type and battery capacity of the electric vehicle, identification information of the electric vehicle, and information about a user of the electric vehicle 40.

To this end, the charging device 30 may communicate with the electric vehicle 40 during charging.

An example of the charging device 30 is shown in FIG. 2, and an example of a coupler 310 is shown in FIG. 3.

Referring to FIGS. 2 and 3, the charging device 30 may include a main body 300, the coupler 310, a charging cable 320, a display part 330, a card reader part 340, a storage box 350, camera parts 361 and 362, and an ultrasonic sensor part 370.

The display part 330 may display various types of infor-mation required for charging on a screen.

For example, in a state in which the charging device 30 is locked, the display part 330 may display information indi-cating that the charging device 30 is preempted, that is, information indicating preemption.

The display part 330 may include a touch screen.

The card reader part 340 may read a credit card, a charge card, and/or a member card though a touch method and/or an insertion method.

The camera parts 361 and 362 may capture images around the charging device 30.

For example, the camera parts 361 and 362 may capture images of the electric vehicle 40 around the charging device 30.

The camera parts 361 and 362 may include a first camera part 361 and a second camera part 362.

The first camera part 361 and the second camera part 362 may be spaced a sufficient distance from each other.

To this end, in the main body 300, the first camera part 361 may be positioned below the display part 330, and the second camera part 362 may be positioned above the display part 330.

FIG. 2 illustrates a case in which there are two camera parts 361 and 362, but the present disclosure may not be limited thereto.

The ultrasonic sensor part 770 may detect the presence or absence of the electric vehicle 40 corresponding to the charging device 30 using ultrasonic waves.

For example, the ultrasonic sensor part 370 may detect information on whether the electric vehicle 40 occupies a parking space corresponding to the charging device 30 using ultrasonic waves.

The charging device 30 may determine whether the elec-tric vehicle 40 occupies the parking space using the infor-mation detected by the ultrasonic sensor part 370.

The storage box 350 may be disposed on the main body 300.

The storage box 350 may store the coupler 310.

The coupler 310 may be electrically connected to the main body 300 through the charging cable 320.

The coupler 310 may be connected to a charging port (not shown) provided in the electric vehicle 40. Then, power supplied from the main body 300 of the charging device 30 may be supplied to the electric vehicle 40 through the charging cable 320 and the coupler 310, and thus the electric vehicle 40 may be charged.

The coupler 310 may be referred to as a charging gun.

The coupler 310 may include a coupler body 314, a latch 311, a handle part 313, a lock button 312, and a charging port 315.

The charging port 315 may be connected to the charging port (not shown) of the electric vehicle.

Through the charging port 315, the charging device 30 may supply power to the electric vehicle 40 and may communicate with the electric vehicle 40.

The charging port 315 may include a direct current (DC) power charging port, an alternating current (AC) power charging port, a proximity sensing port, a ground (GND) terminal, and a communication terminal.

The DC power charging port and the AC power charging port may be ports for supplying power to the electric vehicle 40, and the communication terminal may be a terminal for communication with the electric vehicle 40.

The handle part 313 may be connected to the coupler body 314.

The charging cable 320 may be connected to the coupler body 314.

The latch 311 may be disposed on the coupler body 314.

The latch 311 may prevent the coupler 310 from being separated from the charging port (not shown) of the electric vehicle in a state in which the coupler 310 is connected to the charging port (not shown) of the electric vehicle.

The lock button 312 may be disposed on the coupler body 314 or the charging cable 320.

The latch 311 may be fixed or released by the lock button 312.

The latch 311 may be vertically rotated according to the operation of the lock button 312.

When a user presses the lock button 312, the latch 311 moves upward, and when the user releases the lock button 312, the latch 311 may return to its original position down-ward.

When the coupler 310 is connected to the charging port of the electric vehicle, the user may press the lock button 312 to move the latch 311 upward and to allow the coupler 310 to be easily connected to the charging port of the electric vehicle.

Thereafter, when the user releases the lock button 312, the coupler 310 may be fixed to the charging port of the electric vehicle while the latch 311 returns to its original position downward.

After the charging of the electric vehicle is completed, in a state in which the user presses the lock button 312 again, the coupler 310 may be easily separated from the charging port of the electric vehicle.

Figure 4:
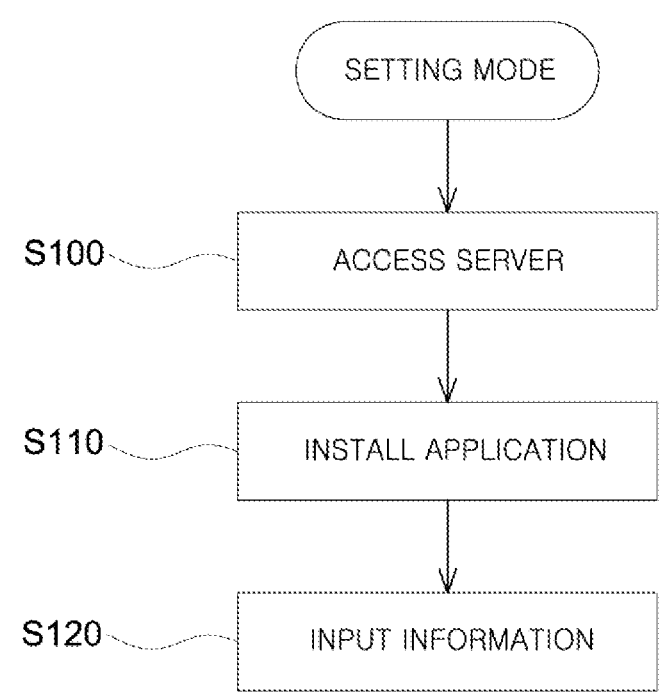
FIG. 4 is a diagram for describing a setting mode.

FIG. 4 is a diagram for describing a setting mode. Hereinafter, descriptions of the above-described parts will be omitted.

The setting mode may be a mode of installing an application (App) for an electric vehicle charging service in the user terminal 10.

Referring to FIG. 4, in the setting mode, the user terminal 10 may access the management server 20 (S100).

The user terminal 10 may download and install the App for an electric vehicle charging service from the management server 20 (S110).

In a process of installing the App, the user terminal 10 may transmit and store information about a user to and in the management server 20. For example, the information includes various types of information such as a user's name, an address, and phone numbers, a payment method, and information about an owned electric vehicle (S120).

FIGS. 5 to 12 are diagrams for describing a search mode. Hereinafter, descriptions of the above-described parts will be omitted.

The search mode may be a mode of searching for at least one usable charging device 30.

Figure 5:
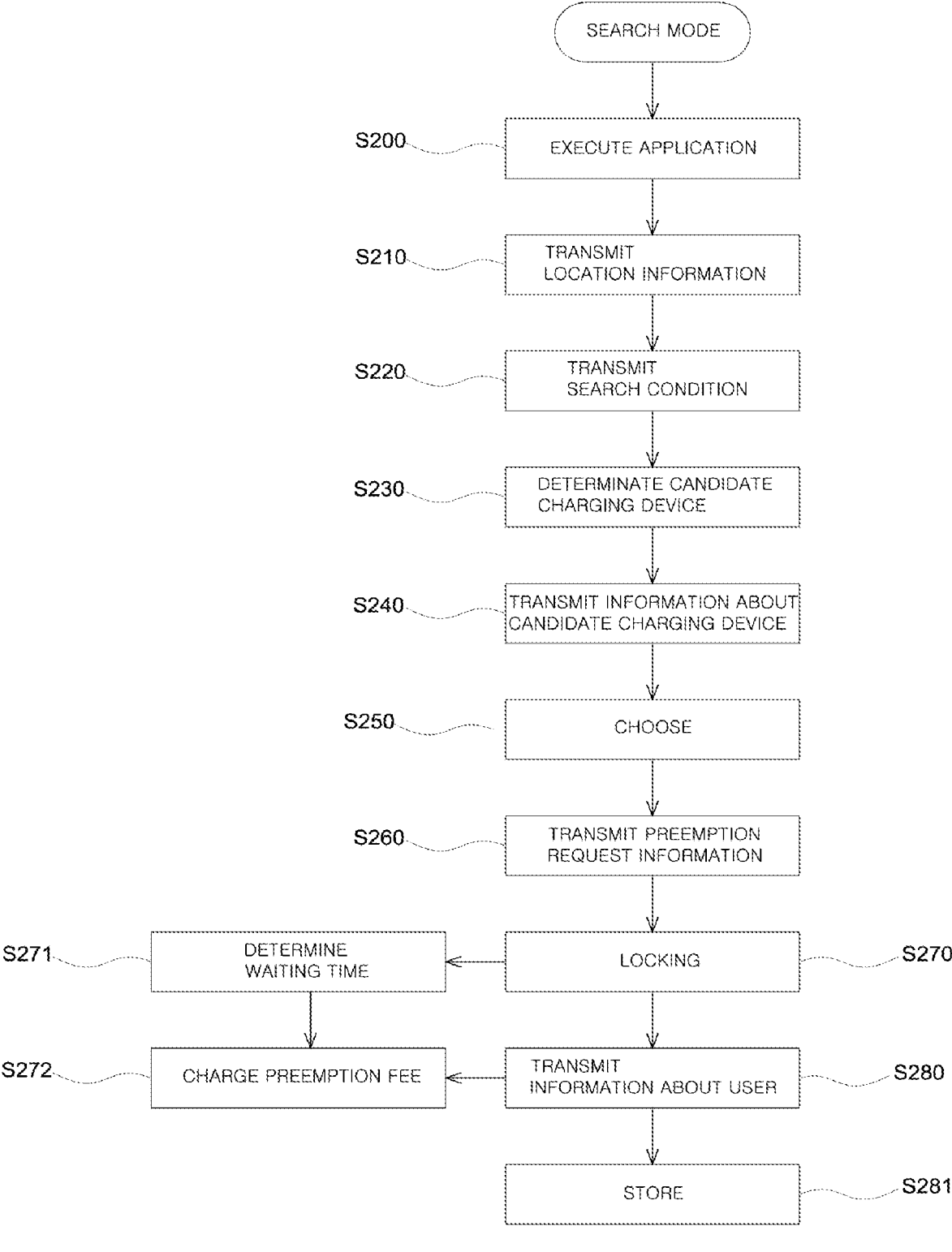
FIGS. 5 to 12 are diagrams for describing a search mode.
Figure 6:
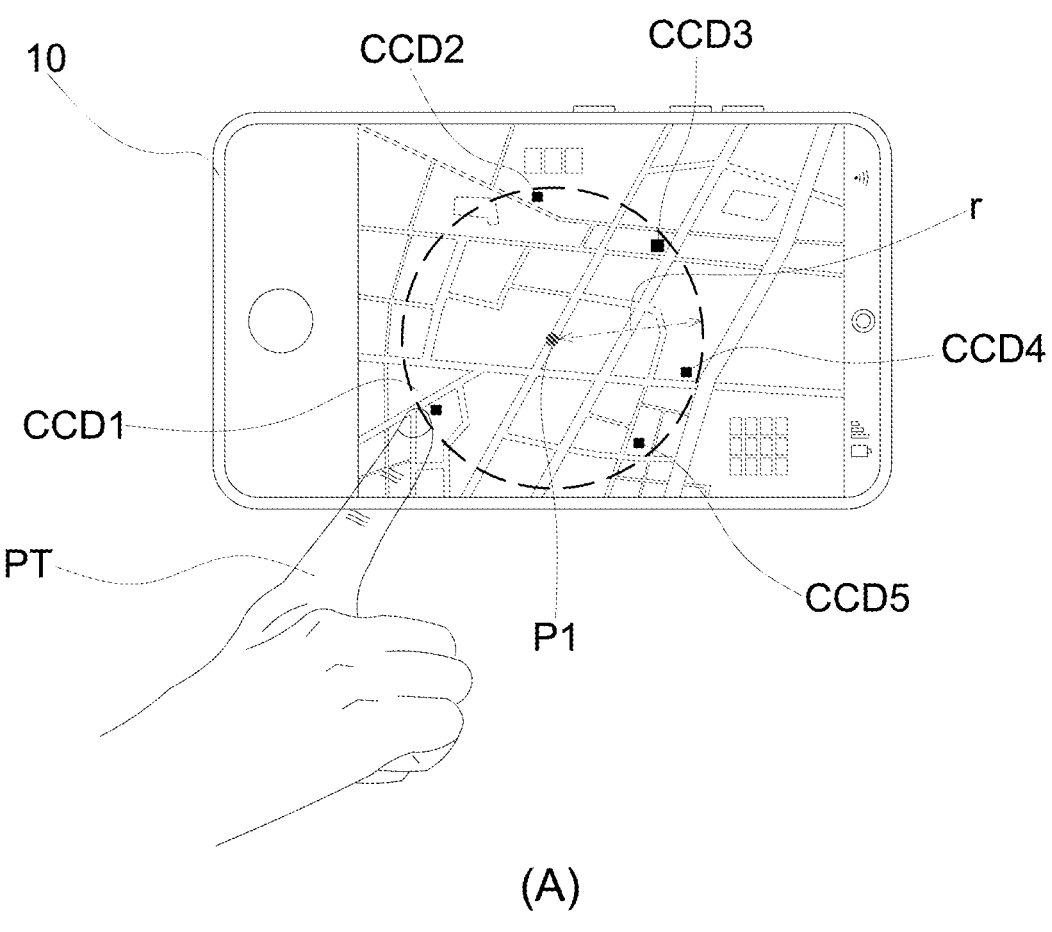
Figure 6:
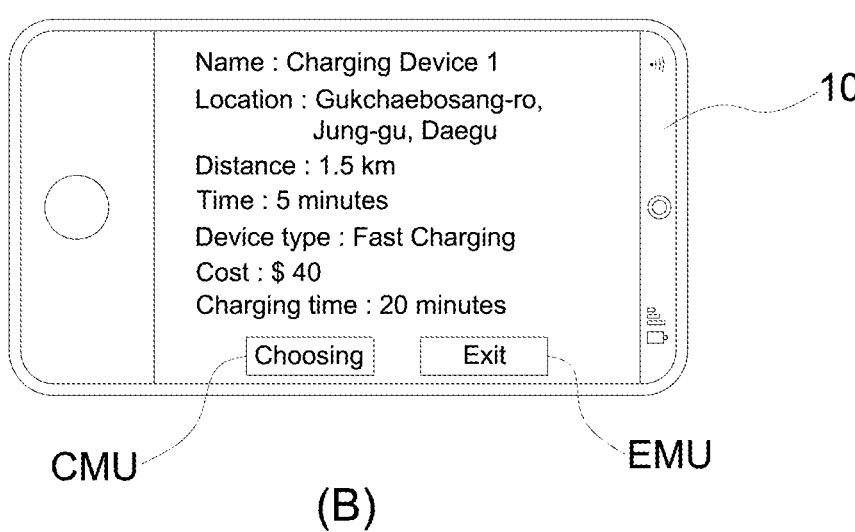

Referring to FIG. 5, in the search mode, an App installed in the user terminal 10 may be executed (S200).

Then, the user terminal 10 may access the management server 20.

Next, the user terminal 10 may transmit location information thereof to the management server 20 (S210).

For example, the user terminal 10 may transmit GPS information (location information) acquired using the GPS module to the management server 20.

The user terminal 10 may transmit information about a search condition to the management server 20 (S220).

The search condition may include at least one of a location condition for a location and a time condition for a time.

The location condition may include a condition for a distance to the charging device 30 from a location included in current location information of the user terminal 10.

The time condition may include a condition for a time taken to reach the charging device 30 from the user terminal 10.

The management server 20 may determine at least one usable charging device 30 based on the location information received from the user terminal 10 (S230).

Alternatively, the management server 20 may determine at least one usable charging device 30 in consideration of both of the location information received from the user terminal 10 and the information about the search condition.

Hereinafter, the determined usable charging device 30 may be referred to as a candidate charging device (CCD) 30.

When a concept of the CCD 30 is applied, it may be regarded that the management server 20 determines at least one usable charging device 30 in consideration of both of the location information received from the user terminal 10 and the information about the search condition.

For example, a user may input a location condition of 5 km and a time condition of 10 minutes to the user terminal 10.

Then, the user terminal 10 may transmit the information about the search condition including the location condition and the time condition to the management server 20.

The management sever 20 may determine at least one CCD 30 located within a radius of 5 km from a current location of the user terminal 10 and located within an area at which the user may arrive within 10 minutes using the electric vehicle 40 from the current location of the user terminal 10.

Thereafter, the management server 20 may transmit information about the at least one determined usable charging device 30, that is, information about the at least one determined CCD 30, to the user terminal 10 (S240).

Here, the information about the at least one determined usable charging device 30, that is, the information about the at least one determined CCD 30, which is transmitted to the user terminal 10, may include at least one of information about a location of the CCD 30, information about a type of the CCD 30, information about a distance between the user terminal 10 and the CCD 30, information about a time taken to reach the CCD 30, information about an estimated charging time, and information about a fee.

The information about the fee may include information on a preemption fee and a charging fee. The contents of the preemption fee and the charging fee will be described in detail below.

The user may choose the CCD 30 in consideration of the information about the at least one CCD 30 received from the management server 20 by the user terminal 10 (S250).

It is assumed that the user terminal 10 sets the location condition of the search condition to be a radius of r km.

In this case, the management server 20 may determine at least one CCD 30 located within a radius of r km from a current location of the user terminal 10.

In addition, the management server 20 may transmit information about the determined CCD 30 to the user terminal 10.

Then, as shown in FIG. 6A, the user terminal 10 may display locations of a plurality of CCDs 30 (CCD1, CCD2, CCD3, CCD4, and CCDS) on a map of a screen so as to correspond to a current location P1 of the user terminal 10.

Here, the user may choose a first candidate charging device 30 (CCD1) from among the plurality of CCDs 30 (CCD1, CCD2, CCD3, CCD4, and CCDS) displayed on the screen of the user terminal 10.

Then, as shown in FIG. 6B, detailed information about the chosen first CCD 30 (CCD1) may be displayed on the screen of the user terminal 10.

When the user chooses a choosing menu CMU in FIG. 6B, the first CCD 30 (CCD1) may be chosen as the charging device 30 desired by the user.

Figure 7:
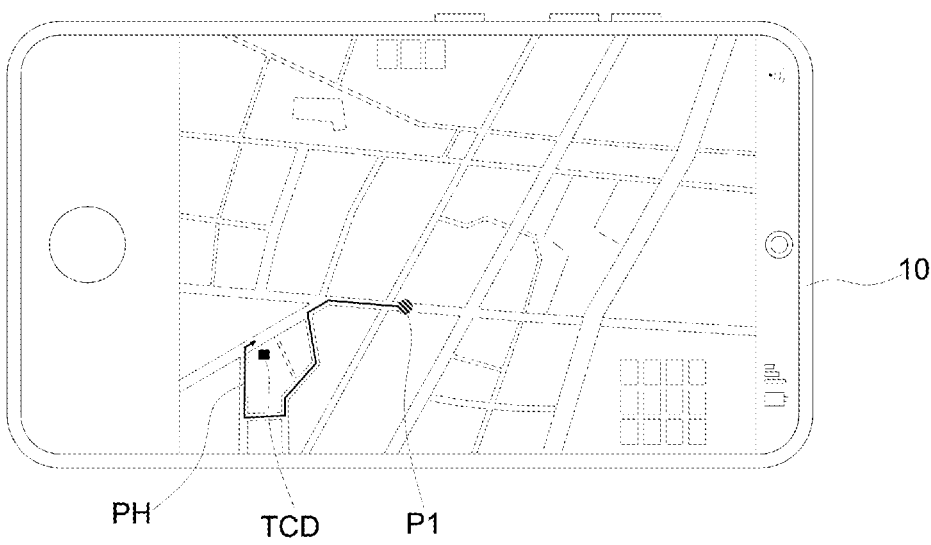
Figure 8:
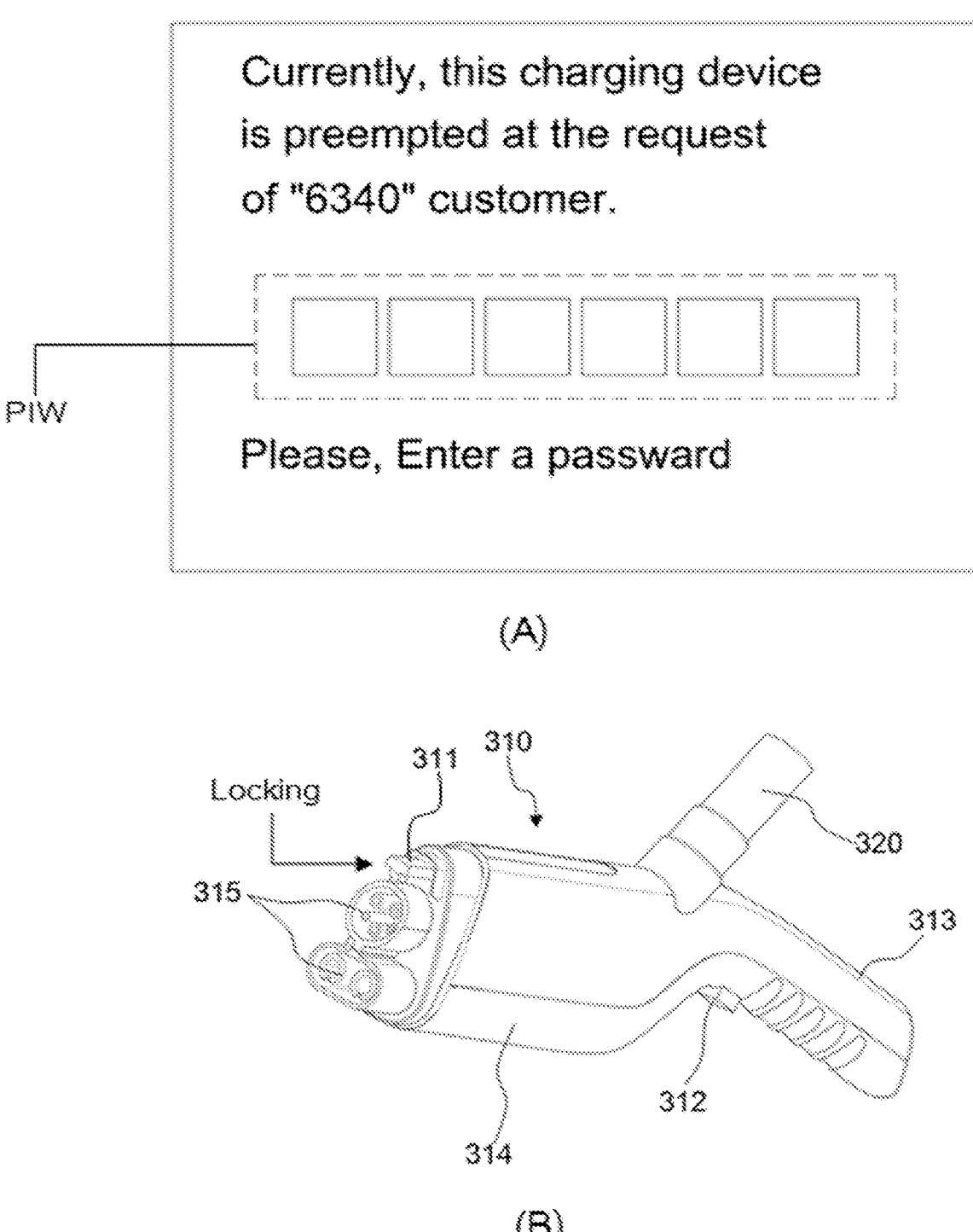

As shown in FIG. 7, the user terminal 10 may display a path PH from the current location P1 of the user terminal 10 to a location of the chosen first CCD 30 (CCD1) on the screen.

The user terminal 10 may transmit information about the chosen CCD 30 to the management server 20.

Hereinafter, the CCD 30 chosen by the user terminal 10 may be referred to as a target charging device (TCD) 30.

In the present document, the concepts of the charging device 30, the CCD 30, and the TCD 30 may be introduced for convenience of description.

The charging device 30, the CCD 30, and the TCD 30 may all have the same configuration.

In addition, the user terminal 10 may transmit preemption request information for preempting the chosen CCD 30, that is, the TCD 30, to the management server 20 (S260).

Then, the management server 20 may transmit a preemption command signal to the TCD 30 in response to the preemption request information for preempting the TCD 30 (S260).

The TCD 30 may be locked in response to the preemption command signal received from the management server 20 (S270).

The TCD 30 may display information indicating preemption on a screen of the display part 330.

For example, as shown in FIG. 8A, information indicating that a corresponding charging device 30 is currently preempted and locked may be displayed on the screen of the display part 330 of the locked TCD 30.

In addition, an authentication information input window PIW for inputting authentication information may be displayed on the screen of the TCD 30.

When the user of the user terminal 10, who transmits the preemption request information to the management server 20, inputs authentication information such as a preset password to the authentication information input window PIW displayed on the screen of the display part 330 of the locked TCD 30, the locked TCD 30 may be unlocked. This will be described in more detail below.

Hereinafter, for convenience of description, the user of the user terminal 10 which transmits the preemption request information to the management server 20 may be referred to as a host user.

In the locked TCD 30, as shown in FIG. 8B, the latch 311 of the coupler 310 for connection with the electric vehicle 40 corresponding to the user may be fixed.

In this case, even when another user attempts to connect the coupler 310 of the locked TCD 30 to a charging port of his/her electric vehicle 40, the charging port 315 of the coupler 310 of the locked TCD 30 may not be connected to a charging port of an electric vehicle of a user different from the host user.

In addition, the management server 20 may transmit information about the host user of the user terminal 10 to the locked TCD 30 (S280).

Specifically, the management server 20 may transmit information about the user of the user terminal 10 who transmits the preemption request information to the locked TCD 30.

The locked TCD 30 may store information about the user of the user terminal 10, who transmits the preemption request information, that is, information about the host user (S281).

In this case, the TCD 30 may determine which user sets the TCD 30 to be a locked state.

The information about the host user transmitted to the locked TCD 30 may include various types of information such as information about the user terminal 10 of the host user, information about a payment method, authentication information, a name of the host user, and a resident registration number.

The authentication information may include information required for authenticating the host user, such as a password, a membership number, and a credit card number.

The authentication information may include information that is generated by the management server 20 in response to the preemption request information.

For example, when the user terminal 10 transmits the preemption request information to the management server 20, the management server 20 may temporarily generate authentication information such as a password that may be used by the user terminal 10 corresponding to the TCD 30 and may transmit the temporarily generated authentication information to the user terminal 10 and the locked TCD 30.

In this case, the host user may unlock the locked TCD 30 using the temporarily generated authentication information received from the management server 20.

In a case in which the locked TCD 30 receives information about the host user from the management server 20 to store the received information, even when a communication failure occurs between the locked TCD 30 and the management server 20, the locked TCD 30 may be smoothly unlocked, and thus the electric vehicle 40 may be smoothly charged.

When a communication failure occurs, the TCD 30 may store information acquired in a charging process, and when communication is resumed thereafter, the TCD 30 may transmit the information acquired in the charging process to the management server 20.

Meanwhile, the use of the chosen CCD 30, that is, the use of the TCD 30, may be restricted from a time point at which the TCD 30 is locked in response to the preemption command signal to a time point at which the TCD 30 is unlocked.

A time from the time point at which the TCD 30 is locked in response to the preemption command signal to the time point at which the TCD 30 is unlocked may be referred to as a waiting time.

The management server 20 may determine a waiting time for the TCD 30 (S271).

A waiting time may be preset in a process in which the host user chooses the TCD 30.

Alternatively, the management server 20 may automatically set a waiting time.

Specifically, when the host user chooses the TCD 30, the management server 20 may determine an estimated time taken for the host user to reach the TCD 30 based on location information of a user terminal, that is, location information of the user terminal 10.

The management server 20 may set a waiting time for the determined estimated time.

After determining the waiting time, the management server 20 may bill a preemption fee to the host user (S272).

Specifically, in order to compensate for a loss that occurs when the TCD 30 is not used for a waiting time of the TCD 30, the management server 20 may bill a fee for the preemption of the TCD 30, that is, a preemption fee, to the host user.

As such, a fee for the time from the time point at which the TCD 30 is locked to the time point at which the TCD 30 is unlocked may be referred to as a first preemption fee.

The first preemption fee billed to the host user may not be refunded.

To this end, the first preemption fee may be billed as a prepayment fee.

From another point of view, the first preemption fee may be billed at the time point at which the TCD 30 is locked.

To this end, the host user needs to preregister a payment method such as a credit card number in the management server 20.

As the time from the time point at which the TCD 30 is locked to the time point at which the TCD 30 is unlocked, that is, the waiting time, increases, the first preemption fee may increase progressively.

It is assumed that a time taken for the host user to reach the CCD 30 is set to 5 minutes.

The management server 20 may set a fee required to lock the TCD 30 such that other users cannot use the TCD 30 for 5 minutes, that is, the first preemption fee, to 500 won.

Alternatively, it is assumed that a time taken for the host user to reach the CCD 30 is set to 10 minutes.

In this case, the management server 20 may set a fee required to lock the TCD 30 such that other users cannot use the TCD 30 for 10 minutes, that is, the first preemption fee, to 1,500 won.

At a time point at which the management server 20 locks the TCD 30 using the preemption command signal in response to the preemption request information transmitted by the host user, the first preemption fee may be billed to the host user.

Hereinafter, a method of determining the CCD 30 will be described in detail.

Figure 9:
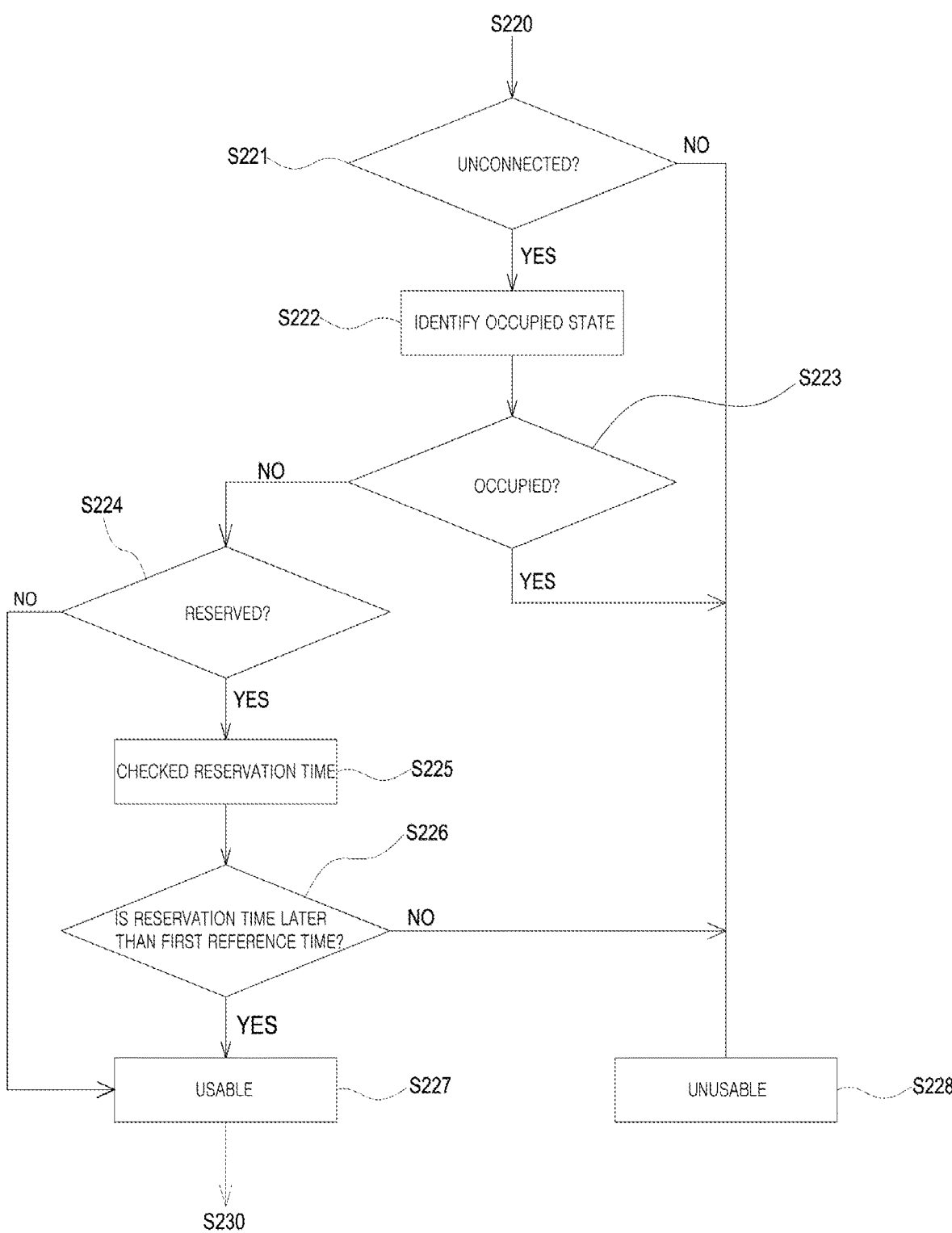

As shown in FIG. 9, when the user terminal 10 transmits location information thereof to the management server 20, based on the location information of the user terminal 10, in consideration of each charging device 30 located within a preset range from a current location of the user terminal 10, the management server 20 may determine whether the charging device 30 is in an unused state (unconnected state) (S221).

As a determination result in operation S221, when the coupler 310 of the charging device 30 is connected to the electric vehicle 40, it may be determined that the charging device 30 is in an unusable state (S228).

On the contrary, as a determination result in operation S221, when the charging device 30 is not connected, the management server 20 may set the corresponding charging device 30 to the CCD 30.

In a state in which the coupler 310 of the charging device 30 is connected to the charging port of the electric vehicle 40, the charging device 30 and the electric vehicle 40 may communicate with each other. Thus, the management server 20 may determine whether the coupler 310 of the charging device 30 is connected to the electric vehicle 40.

As described above, based on the location information of the user terminal 10, the management server 20 may determine at least one usable charging device 30, which is located within a preset range from a current location of the user terminal 10, to be the CCD 30 or may determine at least one usable charging device 30, which is located at a location that may be reached within a certain time from the current location of the user terminal 10, to be the CCD 30.

Here, the CCD 30 may satisfy a condition in which the CCD 30 is in an unconnected state and thus is not used for charging at a determination time.

Specifically, the management server 20 may determine the charging device 30, which is not being currently used among one or more charging devices 30 located within a preset range from the current location of the user terminal 10, to be the CCD 30.

Alternatively, the management server 20 may determine the charging device 30, which is not being currently used among one or more charging devices 30 located at a location that may be reached within a certain time from the current location of the user terminal 10, to be the CCD 30.

Meanwhile, as a determination result in operation S221, when the charging device 30 is not connected, the management server 20 may identify an occupied state of a parking space corresponding to the charging device 30 (S222) and may determine whether the parking space corresponding to the charging device 30 is currently occupied (S223).

The management server 20 may use information detected by the ultrasonic sensor part 370 of the charging device 30 to determine whether the parking space corresponding to the charging device 30 is currently occupied.

The ultrasonic sensor part 370 faces a parking space corresponding to the charging device 30 and may detect whether the electric vehicle 40 is parked in the parking space.

As a determination result in operation S223, when the parking space corresponding to the charging device 30 is currently occupied, the management server 20 may determine that the charging device 30 is in an unusable state (S228).

On the contrary, as a determination result in operation S223, when the parking space corresponding to the charging device 30 is not currently occupied, the management server 20 may determine the corresponding device 30 to be the CCD 30.

From another point of view, the CCD 30 may satisfy a condition in which the parking space corresponding to the charging device 30 is not occupied at a determination time at which an occupied state is determined.

Meanwhile, as a determination result in operation S223, when the parking space corresponding to the charging device 30 is not currently occupied, the management server 20 may determine whether the charging device 30 is in a reserved state (S224), and when the charging device 30 is not in the reserved state, the management server 20 may determine the corresponding charging device 30 to be an usable charging device 30, that is, the CCD 30 (S227).

From another point of view, the CCD 30 may satisfy a condition in which the CCD 30 is not reserved for a preset first reference time from a determination time at which a reservation time is determined.

As a determination result in operation S224, when the charging device 30 is in the reserved state, the management server 20 may check a reservation time of the charging device 30 (S225) and may determine whether the reservation time is later than the preset first reference time (S226).

As a determination result in operation S226, when the reservation time of the charging device 30 is within the first reference time, the management server 20 may determine that the charging device 30 is unusable (S228).

On the contrary, as a determination result in operation S226, when the reservation time of the charging device 30 is later than the first reference time, the management server 20 may determine that the corresponding device 30 is usable (S227) to determine the corresponding device 30 to be the CCD 30.

Here, the first reference time may correspond to a minimum time required to charge the electric vehicle 40 corresponding to the host user.

For example, when about 20 minutes are required to charge the electric vehicle 40 corresponding to the host user, the first reference time may be set to 20 minutes or more.

The first reference time may be changed according to a time required to charge the electric vehicle 40 of the host user.

Meanwhile, when the coupler 310 of the charging device 30 satisfies a preset condition in a state of being connected to the charging port of the electric vehicle 40, the management server 20 may determine the corresponding charging device to be the CCD 30.

Figure 10:
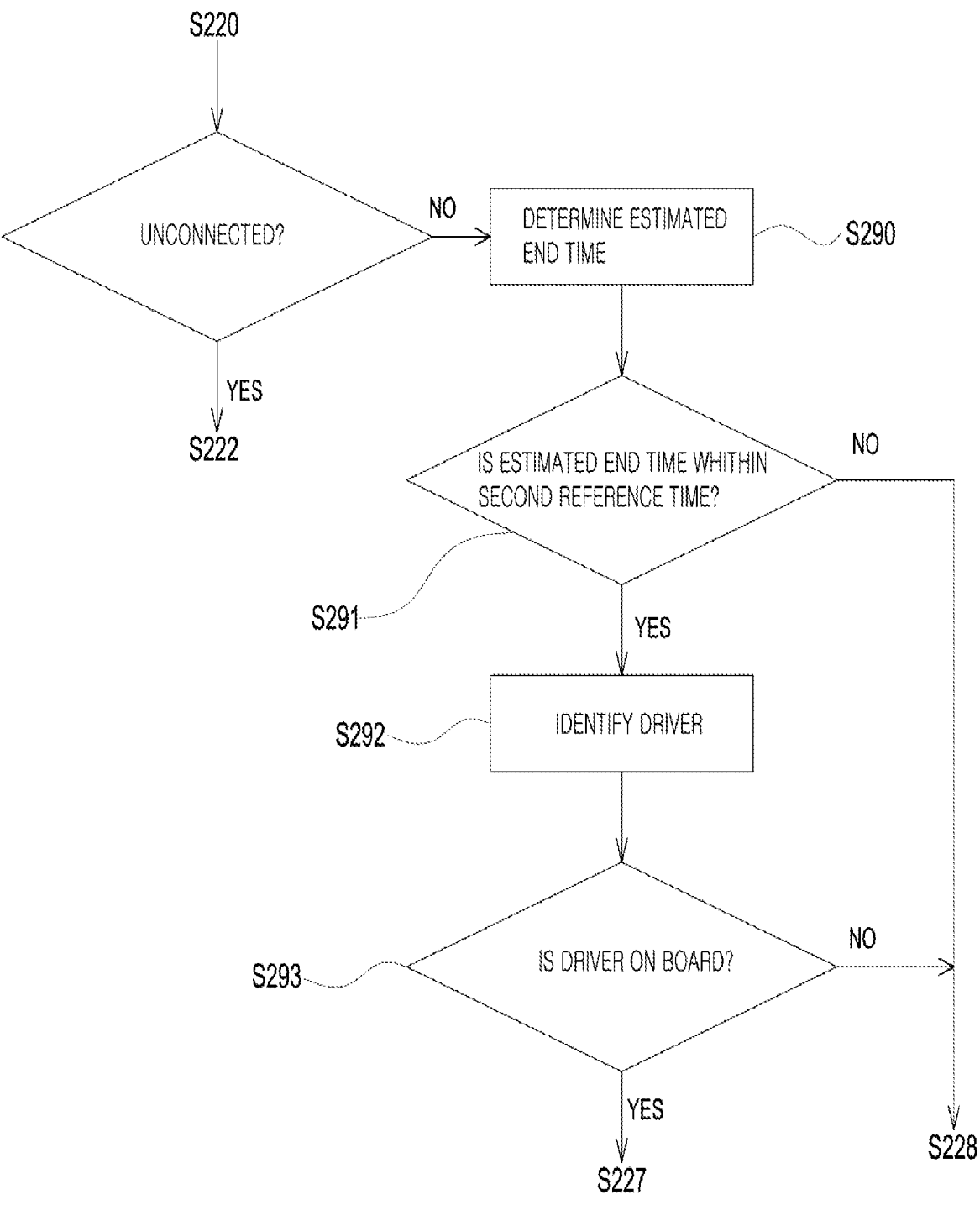

As shown in FIG. 10, as a determination result in operation S221, when the coupler 310 of the charging device 30 is connected to the electric vehicle 40, the management server 20 may determine an estimated charging end time of the charging device 30 (S290).

For example, the management server 20 may determine the estimated charging end time in consideration of information such as battery capacity, charging speed, and the like of the electric vehicle 40 connected to the coupler 310 of the current charging device 30.

Thereafter, the management server 20 may determine whether the estimated charging end time is within a preset second reference time (S291).

As a determination result in operation S291, when the estimated charging end time is later than the second reference time, the management server 20 may determine that the corresponding charging device 30 is unusable (S228).

On the contrary, as a determination result in operation S291, when the estimated charging end time is within the second reference time, the management server 20 may determine the corresponding device 30 to be the usable CCD 30.

From another point of view, the CCD 30 may satisfy a condition in which the CCD 30 is used for charging at a determination time at which the estimated charging end time is determined and the charging is to be finished within the preset second reference time from the determination time.

Meanwhile, as a determination result in operation S291, when the estimated charging end time is within the second reference time, the management server 20 may identify a driver of the electric vehicle 40 which occupies the parking space corresponding to the charging device (S292).

Thereafter, the management server 20 may determine whether the driver is on board of the electric vehicle 40 (S293), and when the driver is not on board, the management server 20 may determine that the corresponding charging device 30 is unusable.

On the contrary, when the driver is on board, the management server 20 may determine the corresponding charging device 30 to be the CCD 30 (S227).

From another point of view, the CCD 30 may satisfy a condition in which the driver of the electric vehicle 40, which occupies the parking space corresponding to the charging device 30, is on board at a determination time.

Next, after a time point at which the charging of the electric vehicle 40 occupying the parking space is finished, the management server 20 may transmit a preemption command to at least one CCD 30 corresponding to the preemption request information to lock the at least one CCD 30 (S270).

A method of determining whether the driver is on board of the electric vehicle 40 will be described in detail below.

Figure 11:
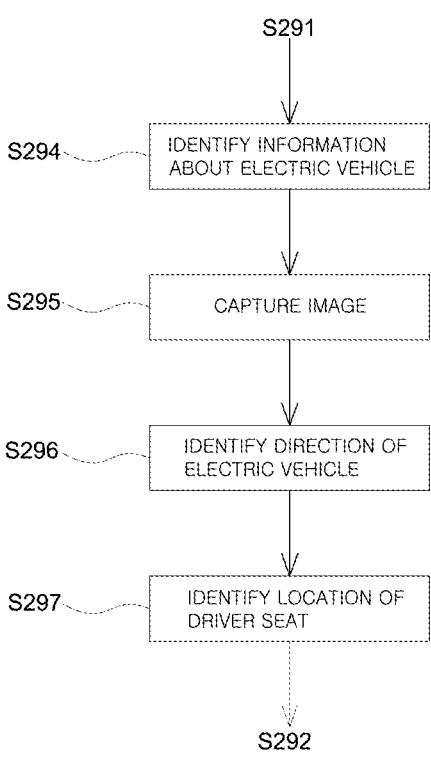
Figure 12:
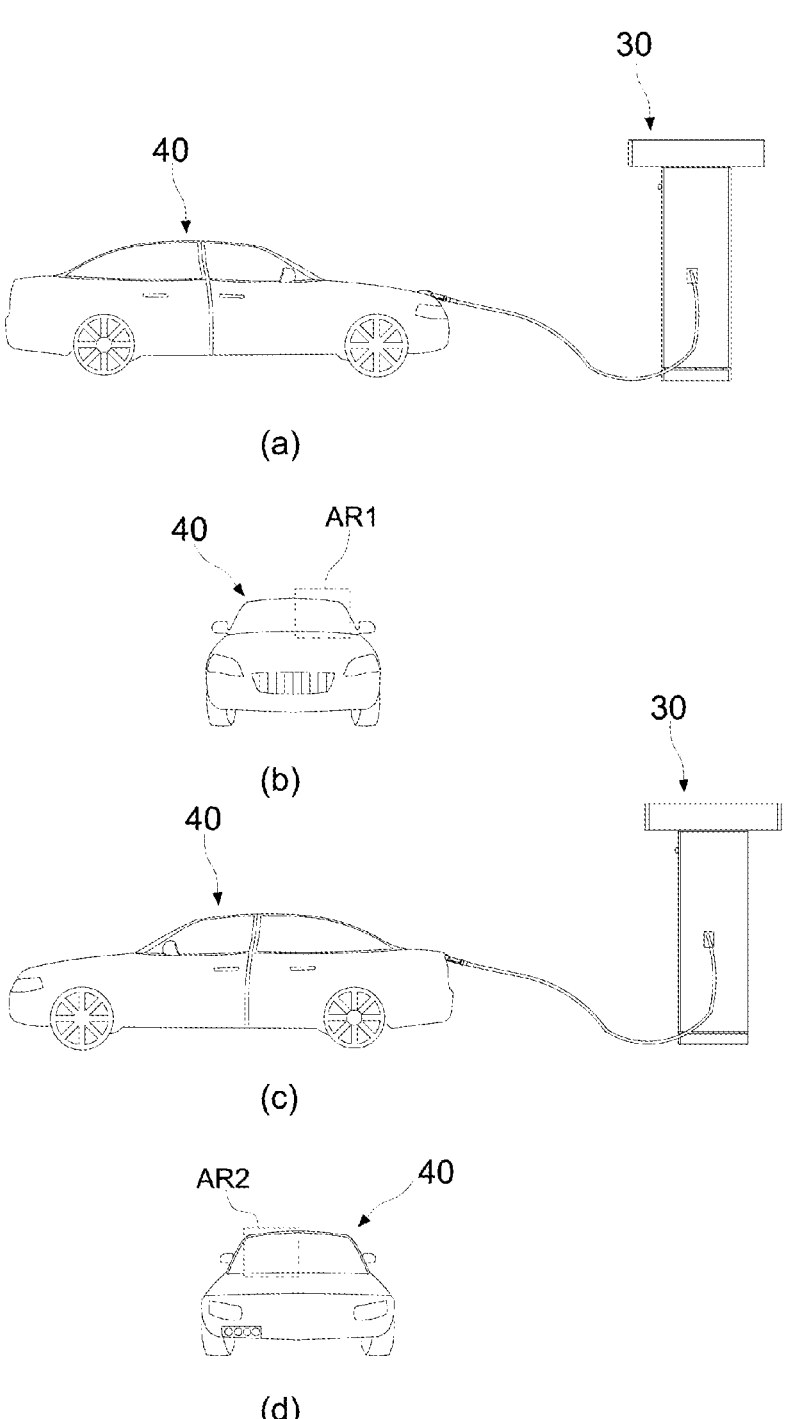

As shown in FIG. 11, the management server 20 may identify information about the electric vehicle 40 connected to the coupler 310 of the charging device 30 (S294).

For example, the management server 20 may identify information about a type of the electric vehicle 40.

When the information about the type of the electric vehicle 40 is identified, a location of the charging port of the electric vehicle 40 may also be identified.

By using the camera parts 361 and 362, the charging device 30 may generate image information by photographing the electric vehicle 40 occupying a parking space (S295).

The charging device 30 may transmit the generated image information to the management server 20.

Then, the management server 20 may analyze the information about the electric vehicle 40 acquired by the charging device 30 through the coupler 310 and the image information received from the charging device 30 to identify a direction of the electric vehicle 40 (S296) and may also identify a location of a driver seat in the electric vehicle 40 (S297).

Thereafter, the driver may be identified at a location corresponding to the identified driver seat (S292).

It is assumed that the electric vehicle 40 is charged in a state of being parked in the parking space such that the charging device 30 is located in front of the electric vehicle 40 as in the case of FIG. 12A.

In this case, as in the case of FIG. 12B, when viewed the electric vehicle 40 from the charging device 30, a possibility that the driver seat is located in a first area AR1 at a right side may be high.

Therefore, when a person is located in the first area AR1 in FIG. 12B, a possibility that the driver is located in the driver seat may be high.

When images are captured using the first and second camera parts 361 and 362 spaced a sufficient distance from each other in the charging device 30, the presence or absence of the driver may be more precisely determined.

It is assumed that the electric vehicle 40 is charged in a state of being parked in the parking space such that the charging device 30 is located behind the electric vehicle 40 as in the case of FIG. 12C.

Even in this case, as in the case of FIG. 12D, when viewed the electric vehicle 40 from the charging device 30, a possibility that the driver seat is located in a second area AR2 at a left side may be high.

As described above, by using the images captured by the camera parts 361 and 362 of the charging device 30 and the information acquired by the charging device 30 from the electric vehicle 40 through the coupler 310, the management server 20 may identify information about a location of the driver seat and information about the presence or absence of the driver.

Figure 13:
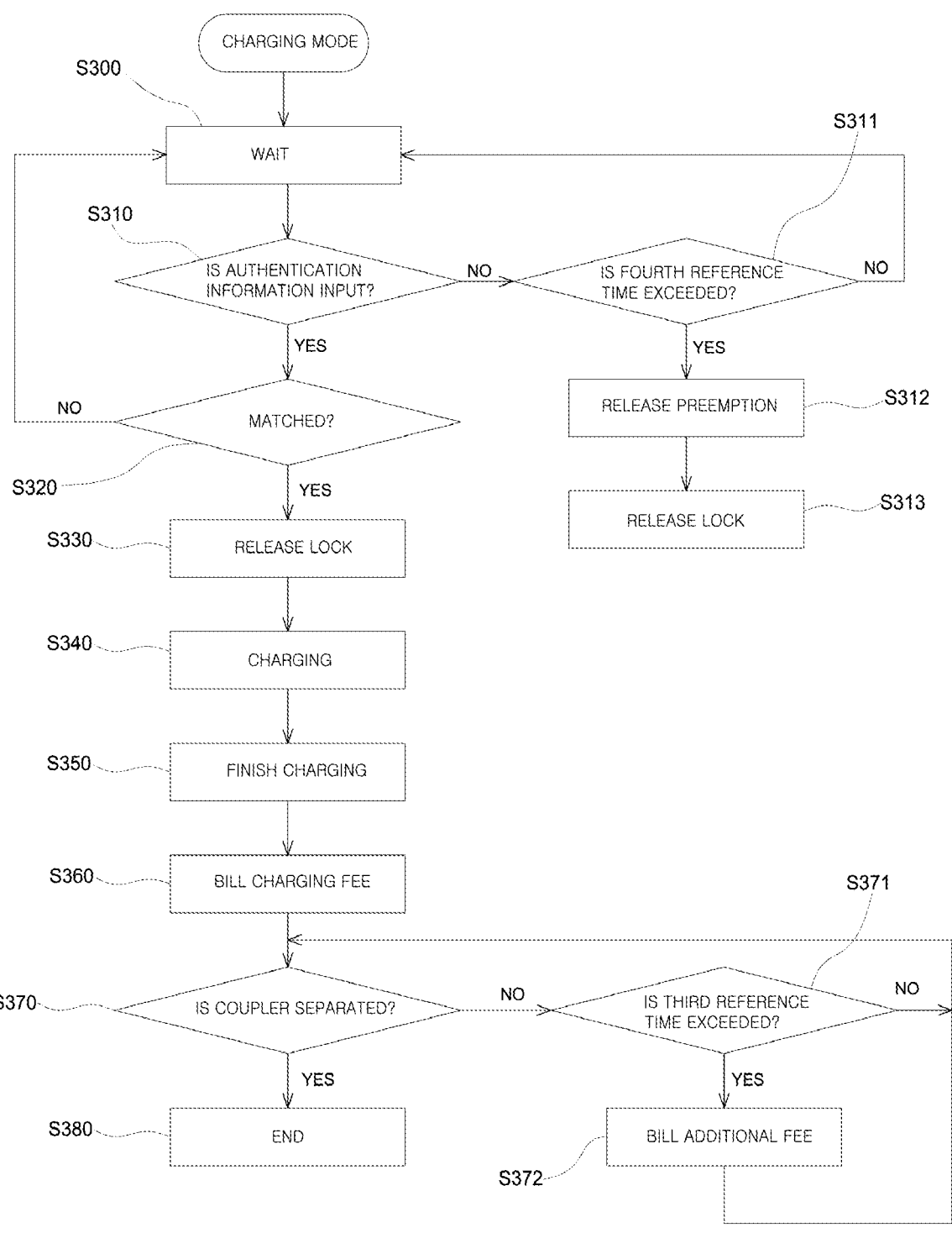
FIG. 13 is a diagram for describing a charging mode.

FIG. 13 is a diagram for describing a charging mode. Hereinafter, descriptions of the above-described parts will be omitted.

The charging mode may be a mode of unlocking the locked TCD 30 and charging the electric vehicle 40.

Referring to FIG. 13, the TCD 30 in a state of being locked in response to a preemption command signal may wait until unlocked (S300).

The TCD 30 in the locked state may determine whether authentication information for authentication of a host user is input (S310).

The authentication information may include information such as a credit card number, a membership number, and a password of the host user.

Alternatively, the authentication information may include temporary information such as a password that is temporarily assigned to the host user by the management server 20.

As a determination result in operation S310, when the TCD 30 in the locked state determines that the authentication information is not input, it may be determined whether a waiting time of the locked TCD 30 in the locked state exceeds a preset fourth reference time (S311).

The waiting time may be counted from a time point at which the TCD 30 in the locked state is locked in response to the preemption command signal.

As a determination result in operation S311, when the waiting time of the locked TCD 30 in the locked state is within the preset fourth reference time, the process may proceed to operation S300.

On the contrary, as a determination result in operation S311, when the waiting time of the locked TCD 30 in the locked state exceeds the preset fourth reference time, the locked TCD 30 may release preemption by a host terminal (S312) and may be unlocked (S313) by itself.

From another point of view, when the authentication information is not input for the preset fourth reference time, the locked TCD 30 may be unlocked and release the preemption.

It is assumed that a first user (host user) uses the user terminal 10 to choose any first charging device 30, sets the chosen first charging device 30 to the TCD 30, and sets a waiting time to 10 minutes.

It may be regarded that the first user promises to reach the TCD 30 within 10 minutes.

The locked TCD 30 may set an extra margin of 1 minute (10% of the waiting time set by the user) in addition to 10 minutes set by the first user.

In this case, the fourth reference time may be a total of 11 minutes.

When the first user does not reach the TCD 30 within 11 minutes, the TCD 30 may release the preemption by the first user and may be unlocked by itself.

Then, users different from the first user may use the unlocked first charging device 30.

Here, a preemption fee corresponding to the waiting time of 10 minutes set by the first user may not be refunded.

Meanwhile, as a determination result in operation S310, when the locked TCD 30 determines that the authentication information is input, the TCD 30 may determine whether the input authentication information matches authentication information stored therein after received from the management server 20 (S320).

As a determination result in operation S330, when the TCD 30 determines that the input authentication information does not match the stored authentication information, the process may proceed to operation S300 again, and when the input authentication information matches the stored authentication information, the TCD 30 may be unlocked by itself (S330).

In other words, the locked TCD 30 may be unlocked upon receiving the authentication information for authenticating the host user.

While communication between the locked TCD 30 and the management server 20 is smoothly performed, the locked TCD 30 may transmit the input authentication information to the management server 20.

Then, the management server 20 may compare the authentication information input to the TCD 30 with authentication information prestored in the management server 20 and may transmit a determination result to the TCD 30.

On the contrary, when communication between the locked TCD 30 and the management server is faulty, the locked TCD 30 may compares the input authentication information with the authentication information stored therein after received in advance from the management server 20 and may determine whether the input authentication information match the stored authentication information.

The TCD 30 may be unlocked and then charge the electric vehicle 40 corresponding to the host user (S340).

That is, the unlocked TCD 30 may charge a battery of the electric vehicle 40 corresponding to the host user.

Thereafter, when the charging of the electric vehicle 40 is finished (S350), the management server 20 may bill a charging fee for the charging of the battery of the electric vehicle 40 to the host user (S360).

The management server 20 may determine whether the coupler 310 of the TCD 30 is separated from the electric vehicle 40 after the charging is finished (S370).

As a determination result in operation S370, when the coupler 310 is separated from the electric vehicle 40, the management server 20 may end a charging process corresponding to the electric vehicle 40 (S380).

On the contrary, as a determination result in operation S370, when the coupler 310 is connected to the electric vehicle 40, the management server 20 may determine whether a preset third reference time has elapsed after the charging of the electric vehicle 40 is finished (S371).

As a determination result in operation S371, when the third reference time has not elapsed, the process may proceed to operation S370.

On the contrary, as a determination result in operation S371, when the third reference time has elapsed, an additional fee may be billed to the host user (S372).

From another point of view, at a first point after the preset third reference period has elapsed from a time point at which the charging of the battery of the electric vehicle 40 is completed, when the coupler 310 of the TCD 30 is connected to the electric vehicle 40, an additional fee may be billed to the host user.

In this case, it is possible to induce the host user to quickly release the occupation of the TCD 30.

Meanwhile, one user may preempt a plurality of charging devices 30. This will be described as follows.

Figure 14:
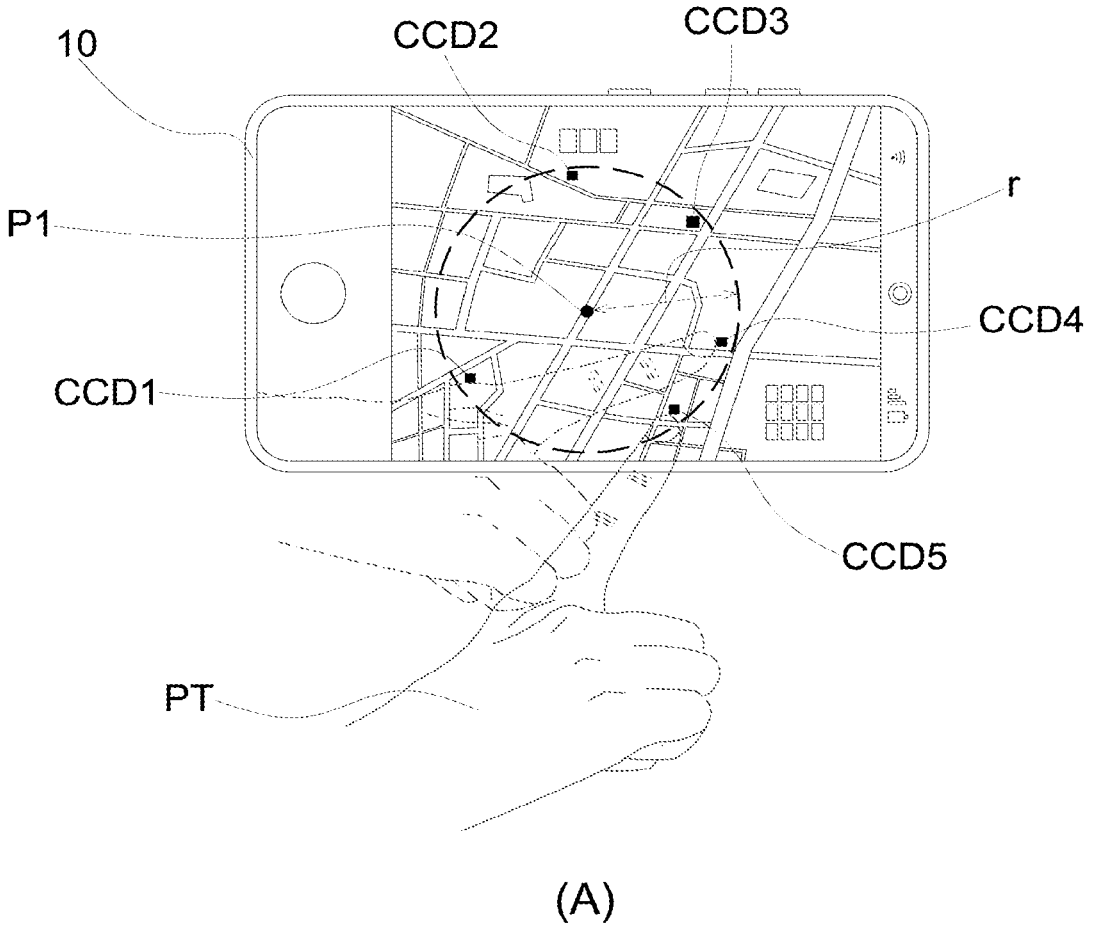
Figure 14:
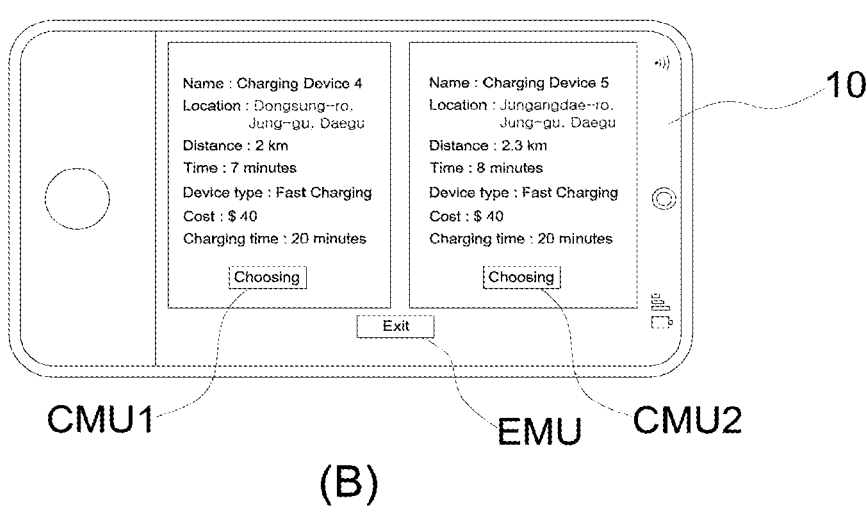
Figure 15:
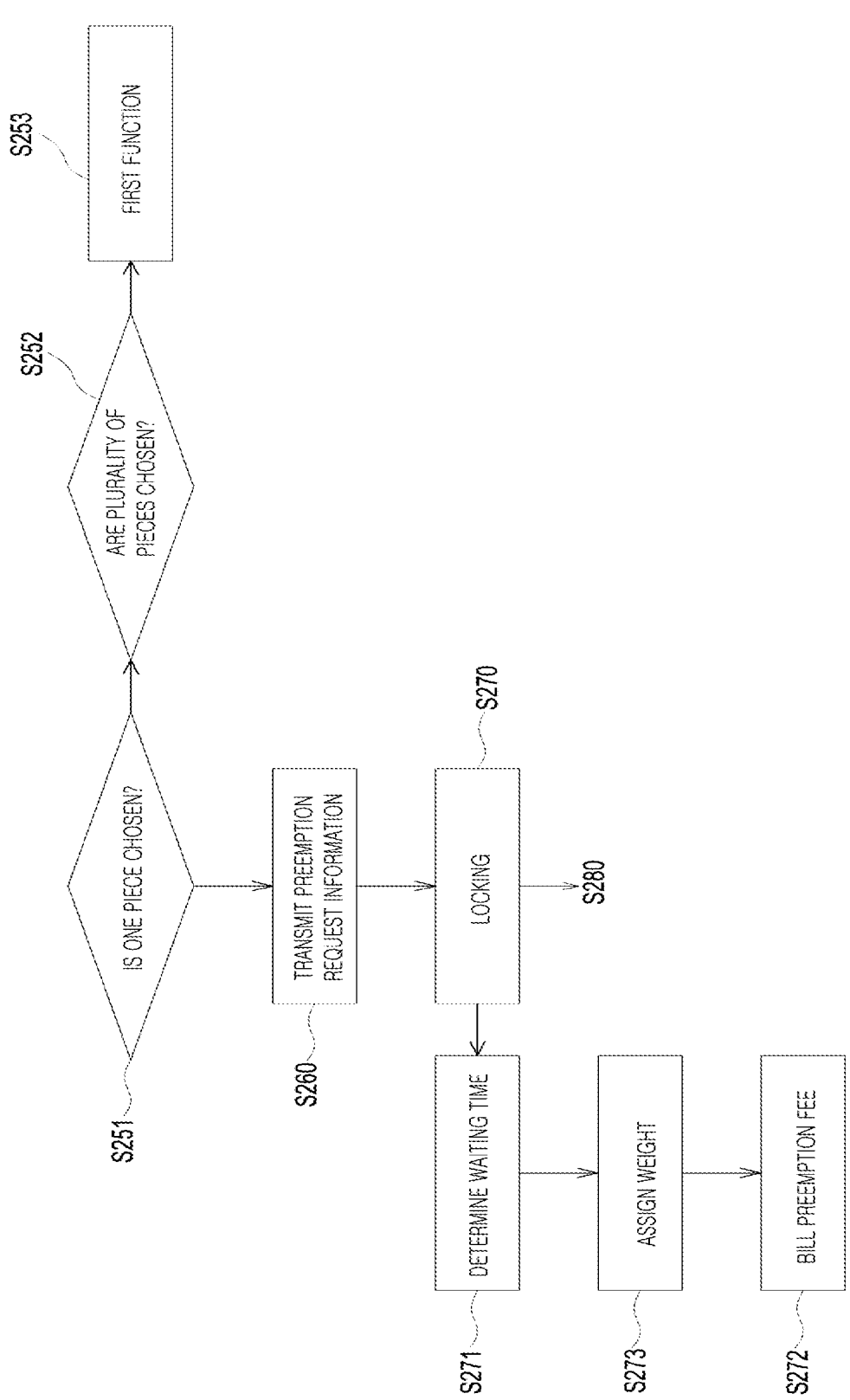

FIGS. 14 to 16 are diagrams for describing an example of a method of preempting a plurality of charging devices. Hereinafter, descriptions of the above-described parts will be omitted.

The management server 20 may provide information about a plurality of CCDs 30 to the user terminal 10.

Then, as shown in FIG. 14A, the user terminal 10 may display locations of the plurality of CCDs 30 (CCD1, CCD2, CCD3, CCD4, and CCDS) on a map of a screen so as to correspond to a current location P1 of the user terminal 10.

Here, a user may choose a plurality of CCDs from among the plurality of CCDs 30 (CCD1, CCD2, CCD3, CCD4, and CCDS) displayed on the screen of the user terminal 10.

For example, the user may choose a fourth candidate CCD 30 (CCD4) and a fifth candidate CCD 30 (CCD5) from among the plurality of CCDs 30 (CCD1, CCD2, CCD3, CCD4, and CCD5) displayed on the screen of the user terminal 10.

Then, as shown in FIG. 14B, detailed information about the chosen fourth CCD 30 (CCD4) and fifth CCD 30 (CCD5) may be displayed on the screen of the user terminal 10.

In FIG. 14B, when the user chooses a choosing menu CMU corresponding to the fourth CCD 30 (CCD4) and a choosing menu CMU corresponding to the fifth CCD 30 (CCD5), the fourth CCD 30 (CCD4) and the fifth CCD 30 (CCD5) may be chosen to be the TCDs 30 desired by the user.

A user who urgently desires to charge the electric vehicle 40 may choose the plurality of CCDs 30.

After the management server 20 transmits information about the at least one determined CCD 30 to the user terminal 10 (S240), as shown in FIG. 15, the management server 20 may determine whether the user terminal 10 chooses one CCD 30 (S251).

As a determination result in operation S251, when the user terminal 10 chooses one CCD 30, the user terminal 10 may transmit preemption request information for preemption of one CCD 30, that is, one TCD 30, to the management server 20 (S260).

On the contrary, as a determination result in operation S251, when the user terminal 10 does not choose one CCD 30, the management server 20 may determine whether the user terminal 10 chooses the plurality of CCDs 30 (S252).

As a determination result in operation S252, when the user terminal 10 does not choose the plurality of CCDs 30, the management server 20 may execute a preset first function (S253).

The first function may include a waiting function until at least one CCD 30 is chosen, a changing function for a search condition, and the like.

On the contrary, as a determination result in operation S252, when the user terminal 10 chooses one CCD 30, the user terminal 10 may transmit preemption request information for preemption of the plurality of chosen CCDs 30, that is, a plurality of TCDs 30, to the management server 20 (S260).

In this case, at least one TCD 30 corresponding to the preemption request information may be locked (S270).

For example, when the user terminal 10 transmits preemption request information for preemption of the plurality of TCDs 30 to the management server 20, the plurality of TCDs 30 corresponding to the preemption request information may be locked.

Thereafter, the management server 20 may transmit information about a host user of the user terminal 10 to at least one locked TCD 30 (S280).

For example, in a state in which the plurality of TCDs 30 are locked, the management server 20 may transmit information about the host user of the user terminal 10 to each of the plurality of locked TCDs 30 (S280).

In addition, in a state in which the plurality of TCDs 30 are locked, the management server 20 may separately bill a preemption fee to each of the TCDs 30.

To this end, the management server 20 may determine a waiting time for the plurality of TCDs 30 (S271).

The management server 20 may assign a weight to each of the plurality of TCDs 30.

The management server 20 may set different weights assigned to the TCDs 30 according to the number of TCDs 30 chosen by the host user.

Preferably, as the number of TCDs 30 chosen by the host user increases, the management server 20 may set the weight assigned to the TCD 30 to be high.

Thereafter, the management server 20 may bill each of preemption fees for the locking of the plurality of TCDs 30 to the host user (S272).

A preemption fee billed to the host user may not be refunded.

For example, when the host user chooses one TCD 30, a weight assigned to the TCD 30 may be set to 1 as shown in FIG. 16A.

In this case, when a waiting time is 10 minutes, a preemption fee may be set to 500 won, when a waiting time is 15 minutes, a preemption fee may be set to 1,000 won, when a waiting time is 20 minutes, a preemption fee may be set to 2,000 won, when a waiting time is 25 minutes, a preemption fee may be set to 4,000 won, and when a waiting time is 30 minutes, a preemption fee may be set to 8,000 won.

As the waiting time increases, the preemption fee may increase progressively.

For example, even when the host user chooses two TCDs 30, weights assigned to the two TCDs 30 may be set to 1.2 as shown in FIG. 16B.

In this case, when a waiting time is 10 minutes, a preemption fee may be set to 600 won, when a waiting time is 15 minutes, a preemption fee may be set to 1,200 won, when a waiting time is 20 minutes, a preemption fee may be set to 2,400 won, when a waiting time is 25 minutes, a preemption fee may be set to 4,800 won, and when a waiting time is 30 minutes, a preemption fee may be set to 9,600 won.

In addition, when the host user chooses three TCDs 30, a weight higher than 1.2, for example, a weight of 1.5 may be assigned to each of the three TCDs 30.

Since, as the number of TCDs 30 chosen by the host user increases, a weight corresponding to a preemption fee is set to be high as described above, it is possible to induce a user to not preempt an unnecessarily large number of TCDs 30.

It is assumed that the host user chooses two CCDs 30, that is, a first CCD 30 and a second CCD 30.

In this case, in consideration of preemption request information received from the user terminal 10 of the host user, the management server 20 may transmit a preemption command signal to the first CCD 30 and the second CCD 30 to lock the first CCD 30 and the second CCD 30.

Thereafter, the management server 20 may transmit information about the user of the user terminal 10, that is, the host user, to the locked first CCD 30 and second CCD 30.

When the host user chooses and uses the first CCD 30 among the first CCD 30 and the second CCD 30, the host user may input preset authentication information to the first CCD.

For example, the host user may input authentication information by bringing a credit card, a membership card, or the like close to the card reader part 340 of the first CCD 30.

Alternatively, the host user may input authentication information by inputting a preset password to an authentication information input window PIW displayed on a display part 330 of the first CCD 30.

In this case, the first CCD 30 may be unlocked in response to the authentication information input by the host user.

Thereafter, the host user may charge a battery of the electric vehicle 40 using the unlocked first CCD 30.

Then, the management server 20 may bill a charging fee according to the charging of the battery of the electric vehicle 40 to the host user corresponding to the first CCD 30.

In addition, in consideration of the host user, the management server 20 may charge a second preemption fee for a time from a time point at which the first CCD 30 is locked to a time point at which the first CCD 30 is unlocked.

The second preemption fee may be billed as a prepayment fee and may not be refunded.

Here, the second preemption fee may be an amount to which a weight of 1.2 is assigned as described with reference to FIG. 16.

When the host user chooses one TCD 30, a preemption fee (first preemption fee) to which a weight of 1 is assigned may be billed to the host user.

The second preemption fee may be higher than the first preemption fee.

The second CCD 30 may be unlocked upon unlocking the first CCD 30.

As described above, at a time point at which the user chooses and uses the first CCD 30, the second CCD 30 may be unlocked.

Then, in consideration of the host user, the management server 20 may bill the second preemption fee for a time from a time point at which the second CCD 30 is locked to a time point at which the second CCD 30 is unlocked.

Since the second CCD 30 is not used to charge the electric vehicle 40 of the host user, a charging fee for the second CCD 30 may not be billed to the host user.

As described above, the present disclosure is described with reference to one embodiment shown in the drawings but is only an example, and it may be understood that various modifications and other equivalents may be performed by those skilled in the art.

Accordingly, a technical scope of the present disclosure should be determined by a technical spirit of the appended claims.

What is claimed is:

1. A method of charging an electric vehicle, the method comprising:

transmitting, by a user terminal, location information of the user terminal to a management server;

determining, by the management sever, at least one usable charging device corresponding to the location information;

transmitting, by the management sever, information about the at least one determined usable charging device to the user terminal;

choosing, by the user terminal, at least one charging device among the at least one determined usable charging device;

transmitting, by the user terminal, a preemption request information for preemption of the chosen at least one charging device to the management server;

transmitting, by the management sever, a preemption command signal to the at least one charging device corresponding to the preemption request information to lock the at least one charging device;

generating, by the management server, authentication information in response to the preemption request information;

transmitting, by the management sever, information about a user of the user terminal to a locked charging device;

storing, by the locked charging device, the information about the user;

unlocking the locked charging device in response to the information about the user and input of the authentication information; and based on a determination that a communication failure has occurred, storing, by the unlocked charging device, information acquired during a charging process and transmitting the information acquired during the charging process to the management server when communication is resumed.

2. The method of claim 1, further comprising transmitting, by the user terminal, information about a search condition to the management server, wherein the search condition includes at least one of a location condition for a location and a time condition for a time.

3. The method of claim, 2, wherein:

the location condition includes a condition for a distance from the user terminal to the charging device; and the time condition includes a condition for a time taken to reach the charging device from the user terminal.

4. The method of claim 1, wherein the at least one usable charging device satisfies a condition in which the at least one usable charging device is not used at a determination time.

5. The method of claim 4, wherein the at least one usable charging device further satisfies a condition in which the at least one usable charging device is not reserved for a preset first reference time from the determination time.

6. The method of claim 5, wherein the at least one usable charging device further satisfies a condition in which a parking space corresponding to the at least one usable charging device is not occupied at the determination time.

7. The method of claim 1, wherein the at least one usable charging device satisfies a condition in which the at least one usable charging device is used for charging at a determination time and the charging is to be finished within a preset second reference time from the determination time.

8. The method of claim 7, wherein, after a time point at which the charging is finished, the management server transmits a preemption command to the at least one charging device corresponding to the preemption request information to lock the at least one charging device.

9. The method of claim 1, wherein the information about the at least one determined usable charging device includes at least one of information about a location of the at least one determined usable charging device, information about a type of the at least one determined usable charging device, information about a time taken to reach the at least one determined usable charging device, information about an estimated charging time, and information about a fee.

10. The method of claim 1, wherein, in the locked charging device, a latch of a coupler for connection with an electric vehicle corresponding to the user is fixed.

11. The method of claim 1 further comprising displaying, by the locked charging device, information indicating preemption on a screen.

12. The method of claim 1, further comprising:

charging, by the unlocked charging device, a battery of an electric vehicle corresponding to the user; and billing, by the management server, a charging fee for the charging of the battery.

13. The method of claim 12, wherein, when a coupler of the charging device is connected to the electric vehicle at a first time point at which a third preset reference period has elapsed from a time point at which the charging of the battery is completed, the management server bills an additional fee to the user.

14. The method of claim 1, further comprising billing, by the management server, a first preemption fee for a time from a time point at which the at least one charging device is locked to a time point at which the at least one charging device is unlocked to the user.

15. The method of claim 14, wherein the first preemption fee is billed at the time point at which the at least one charging device is locked.

16. The method of claim 14, wherein, as a time from the time point at which the at least one charging device is locked to the time point at which the at least one charging device is unlocked is increased, the first preemption fee increases progressively.

17. The method of claim 14, further comprising: transmitting, by the management server, the preemption command signal to a first charging device and a second charging device corresponding to the preemption request information to lock the first charging device and the second charging device;

transmitting, by the management server, the information about the user of the user terminal to the locked first charging device and the locked second charging device;

unlocking the first charging device upon receiving the authentication information;

unlocking the second charging device upon unlocking the first charging device;

charging, by the unlocked first charging device, a battery;

billing, by the management server, a charging fee for the charging of the battery to the first charging device;

billing, by the management server, a second preemption fee for a time from a time point at which the first charging device is locked to a time point at which the first charging device is unlocked to the user;

and billing, by the management server, the second preemption fee for a time from a time point at which the second charging device is locked to a time point at
which the second charging device is unlocked to the
user.

18. The method of claim 17, wherein the first preemption
fee is different from the second preemption fee.

19. The method of claim 1, further comprising, when the
authentication information is not input for a preset fourth
reference time, unlocking the locked charging device.

20. A system for charging an electric vehicle, the system
comprising;
    a user terminal;
    a management server; and
    a charging device;
    wherein:
    the user terminal is configured to transmit a location
      information of the user terminal to the management
      sever;
    the management sever is configured to determine at least
      one usable charging device in response to the location
      information;
    the management sever is configured to transmit informa-
      tion about the at least one determined charging device
      to the user terminal;
    the user terminal is configured to select at least one
      charging device among the at least one determined
      charging device;

the user terminal is configured to transmit a preemption
    request information for preemption of the chosen at
    least one charging device to the management server;
the management sever is configured to transmit a pre-
    emption command signal to the at least one charging
    device corresponding to the preemption request infor-
    mation to lock the at least one charging device;
the management server is configured to generate authen-
    tication information in response to the preemption
    request information from the user terminal;
the management sever is configured to transmit informa-
    tion about a user of the user terminal to a locked
    charging device;
the locked charging device is configured to store the
    information about the user;
the locked charging device is configured to unlock upon
    receiving the information about the user and the
    authentication information; and
based on a determination that a communication failure has
    occurred, storing, by the unlocked charging device is
    configured to store information acquired during a
    charging process and transmit the information acquired
    during the charging process to the management server
    when communication is resumed.

\* \* \* \* \*